US011927078B1

(12) United States Patent
Couch et al.

(10) Patent No.: US 11,927,078 B1
(45) Date of Patent: Mar. 12, 2024

(54) UNDERWATER SEPARATOR

(71) Applicant: Couvillion Group, Belle Chasse, LA (US)

(72) Inventors: Walter Jack Couch, Cypress, TX (US); Kevin J. Kennelley, Tequesla, FL (US); Timothy Couvillion, Belle Chasse, LA (US); Scott Schexnayder, Maurice, LA (US)

( * ) Notice: Subject to any disclaimer, the term of this patent is extended or adjusted under 35 U.S.C. 154(b) by 591 days.

(21) Appl. No.: 17/132,057

(22) Filed: Dec. 23, 2020

Related U.S. Application Data

(63) Continuation-in-part of application No. 17/036,752, filed on Sep. 29, 2020.

(60) Provisional application No. 62/975,550, filed on Feb. 12, 2020, provisional application No. 62/955,953, filed on Dec. 31, 2019.

(51) Int. Cl.
| | | |
|---|---|---|
| *E21B 43/01* | (2006.01) | |
| *E02B 15/04* | (2006.01) | |
| *E21B 43/36* | (2006.01) | |

(52) U.S. Cl.
CPC ........ *E21B 43/0122* (2013.01); *E02B 15/045* (2013.01); *E21B 43/36* (2013.01)

(58) Field of Classification Search
CPC . E21B 43/0122; B01D 19/0068; E02B 15/00; E02B 2015/005
See application file for complete search history.

(56) References Cited

U.S. PATENT DOCUMENTS

| | | | |
|---|---|---|---|
| RE27,308 E | 3/1972 | Leonard | |
| 9,217,317 B2 * | 12/2015 | Backes | .................... B63B 35/32 |
| 2010/0038324 A1 * | 2/2010 | Couch | ................. E21B 43/0122 |
| | | | 210/538 |
| 2012/0160509 A1 | 6/2012 | Caldwell | |
| 2016/0160614 A1 * | 6/2016 | Ward | .................. E21B 43/0122 |
| | | | 210/170.11 |
| 2016/0265317 A1 | 9/2016 | Vu | |
| 2019/0022560 A1 | 1/2019 | De Sorbier | |

FOREIGN PATENT DOCUMENTS

| | | | |
|---|---|---|---|
| WO | WO 81/01310 | * 5/1981 | ............... E21B 7/12 |

OTHER PUBLICATIONS

Wells Fargo Deepwater & Subsea Technology Forum, Nov. 29, 2018.
Subsea Separation and Processing of Oil, Gas & Produced Water: Past, Present and Future: Why We Need It Now, Jan. 13, 2012.

* cited by examiner

*Primary Examiner* — Youngsul Jeong
(74) *Attorney, Agent, or Firm* — Emily L. Gordy; Raymond G. Areaux; Matthew Miller, III

(57) ABSTRACT

An improved underwater oil, gas and water separator used as party of a hydrocarbon containment system for recovery of oil and/or gas subsea, especially from downed structures with leaking production wells.

21 Claims, 12 Drawing Sheets

SECTION E-E

UNDERWATER SEPARATOR

REFERENCE TO RELATED APPLICATION

The instant application claims priority to U.S. provisional application No. 62/955,953 filed on Dec. 31, 2019, U.S. provisional application No. 62/975,550 filed on Feb. 12, 2020 and U.S. non-provisional application Ser. No. 17/036,752 filed on Sep. 29, 2020.

FIELD OF THE INVENTION

An improved three phase (oil, gas and water) underwater separator used as part of a hydrocarbon containment system for recovery of oil and/or gas subsea, especially from downed structures with leaking production wells or ruptured pipelines or flowlines.

BACKGROUND OF THE INVENTION

Downed production platforms and submerged oil pipelines can become victim to uncontrolled oil and gas leaks. For example, an offshore production platform toppled by a hurricane can have multiple wells leaking oil and gas into the ocean thereby polluting the ocean and shoreline. Collection domes can be used to collect leaking oil and gas streams and a separator, attached to the collection dome, can be used to separate gas, oil and water so that the oil can be collected and safely removed.

During the oil collection process, the oil, gas and ocean water mixture may enter into the separator by slug flow wherein the oil, gas and water mixture enters the upper chamber at a relatively high velocity. During this slug flow, due to the turbulent flow of the mixture, gas may become entrained in the oil and flow through the oil downcomers from the upper chamber to the lower chamber and eventually out of the separator into the oil storage containers. It is disadvantageous for the oil removed from the separator to include gas since the gas will take up valuable space in the oil storage containers. Thus, it would be advantageous for a separator to include improvements that remove entrained gas from the oil and further remove any gas that accumulates in the lower chamber of the separator.

The present invention comprises an improved separator which includes all or some of the following novel improvements for ensuring that gas is properly and efficiently separated from the entrained oil: (1) a gas vent pipe connecting the upper chamber and the lower chamber of the separator wherein the gas vent pipe allows gas carried into the lower chamber and accumulating below the interior plate to vent back to the upper chamber to be further processed; (2) oil downcomers that include angled ends to direct the flow of oil into the lower chamber away from the oil pad and the oil outlet pipe so to prevent disturbance to the oil pad within the separator and, in addition, the angled ends direct oil towards the walls of the separator to further aid in separating gas from entrained oil; (3) a gas shield box surrounding a lower portion of the oil outlet pipe so to shield gas from entering the oil outlet pipe and further stabilize the oil pad; (4) a gas equalization pipe connecting the gas shield box and the upper chamber that vents any gas accumulating (that separates from the entrained oil) in the gas shield box back to the upper chamber; (5) an angled end to the oil outlet pipe to prevent gas from entering the oil outlet pipe; and (6) a separator baffle with alternating panels which is located at the bottom of the lower chamber to calm the oil pad in the lower chamber, prevents surges and motion from wave currents and aids in separation of entrained gas.

SUMMARY OF THE INVENTION

The present invention comprises an improved underwater oil, gas and water separator comprising a separator exterior enclosing an upper chamber and a lower chamber wherein the upper chamber and lower chamber are separated by an interior plate, a separator lid secured to the top of the separator exterior, at least one gas outlet pipe connected to the separator lid, a gas vent pipe connecting the lower chamber and the upper chamber wherein the gas vent pipe comprises two ends with a first end adjacent to the upper chamber through the separator exterior and a second end adjacent to the lower chamber also though the separator exterior, an oil outlet pipe passing through the separator lid, the upper chamber, the interior plate and into the lower chamber, at least one oil downcomer passing through the interior plate and connecting the upper chamber and lower chamber and a separator baffle substantially located within the lower chamber.

The present invention also comprises an improved underwater oil, gas and water separator comprising an upper chamber and a lower chamber wherein the upper chamber and lower chamber are enclosed by a separator exterior and separated by an interior plate, at least one gas vent pipe capable of venting gas from the lower chamber to the upper chamber, an oil outlet pipe capable of moving oil from the lower chamber out of the separator, at least one oil downcomer capable of moving oil from the upper chamber to the lower chamber and a separator baffle capable of calming oil located in the lower chamber.

DETAILED DESCRIPTION

Figure 1:
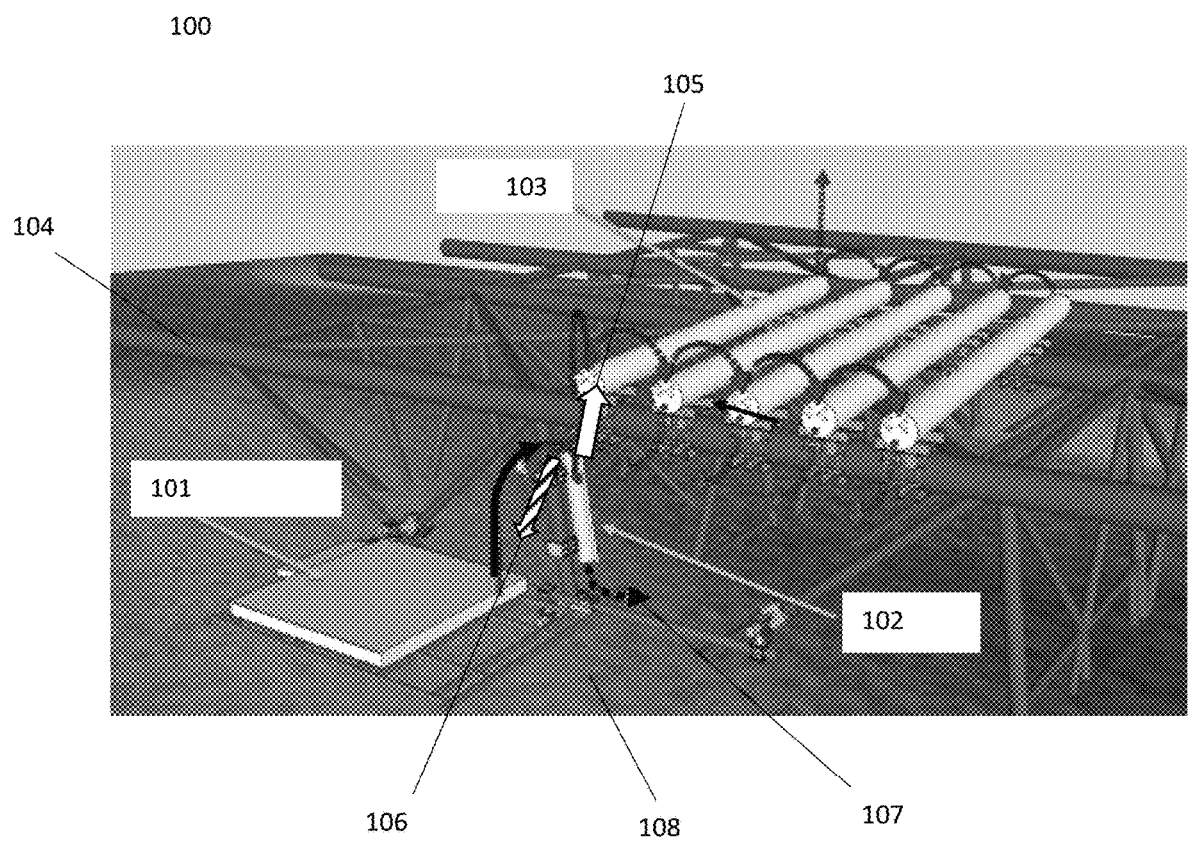
FIG. 1 shows an exemplary containment system utilizing an improved underwater separator.

Referring to FIG. 1, a containment system 100 (generally comprising a collection dome 101, a three-phase separator 102 and oil storage containers 103) may be secured to bracing 104 and/or a subsea floor 108 and used to collect oil 105 and gas 106 released from the subsea floor 108. The collection dome 101 is placed over the location from where the oil 105 and gas 106 are escaping, and is further connected to the separator 102. The separator 102 receives the oil 105 and gas 106 (and some surrounding ocean water 107) collected from the collection dome 101 and separates oil 105 and/or gas 106 from the ocean water 107. The separated gas 106 is vented out the top of the separator 102, the separated oil 105 flows to the oil storage containers 103 and the water 107 is pushed out the bottom of the separator 102. The flowpaths of the oil 105, gas 106 and water 107 out of the separator 102 are shown in FIG. 1.

Figure 2:
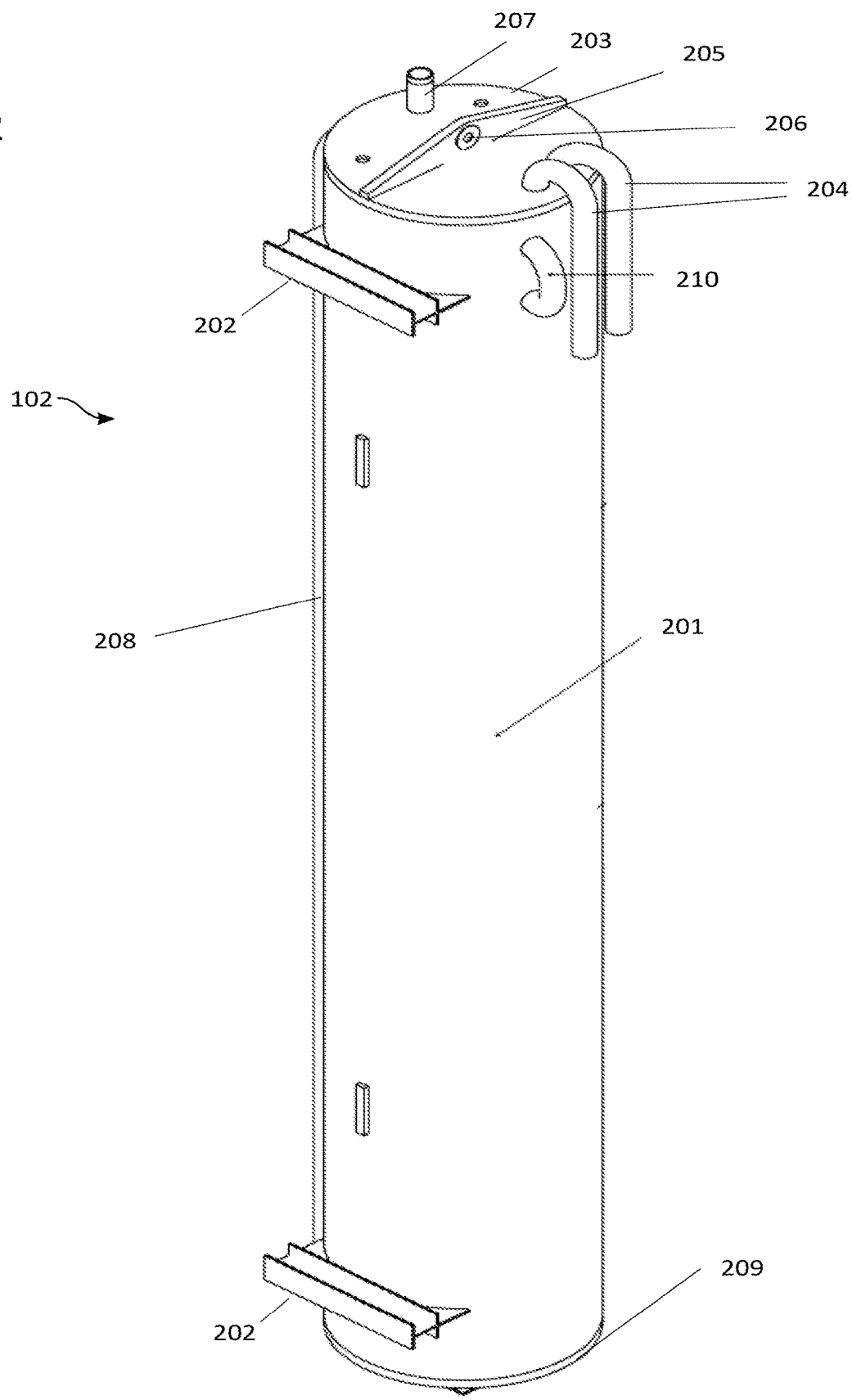
FIG. 2 shows an exterior view of an improved underwater separator.

FIG. 2 shows an exemplary embodiment of an improved three-phase underwater separator 102. In this embodiment, the separator 102 is generally cylindrical in shape, is approximately 25 feet tall, 4 feet in diameter and made substantially of ASTM A572 and/or ASTM A53 steel. One or more I-beams 202 may be secured to the separator exterior 201 to assist in transporting the separator 102 and to prevent it from rolling during transportation. At the top of the separator 102 is the separator lid 203. The separator lid 203 may include a lid attachment piece 205 with a lid eyelet 206 wherein the attachment piece 205 and eyelet 206 are useful in transporting, installing and removing the separator 102.

Figure 3:
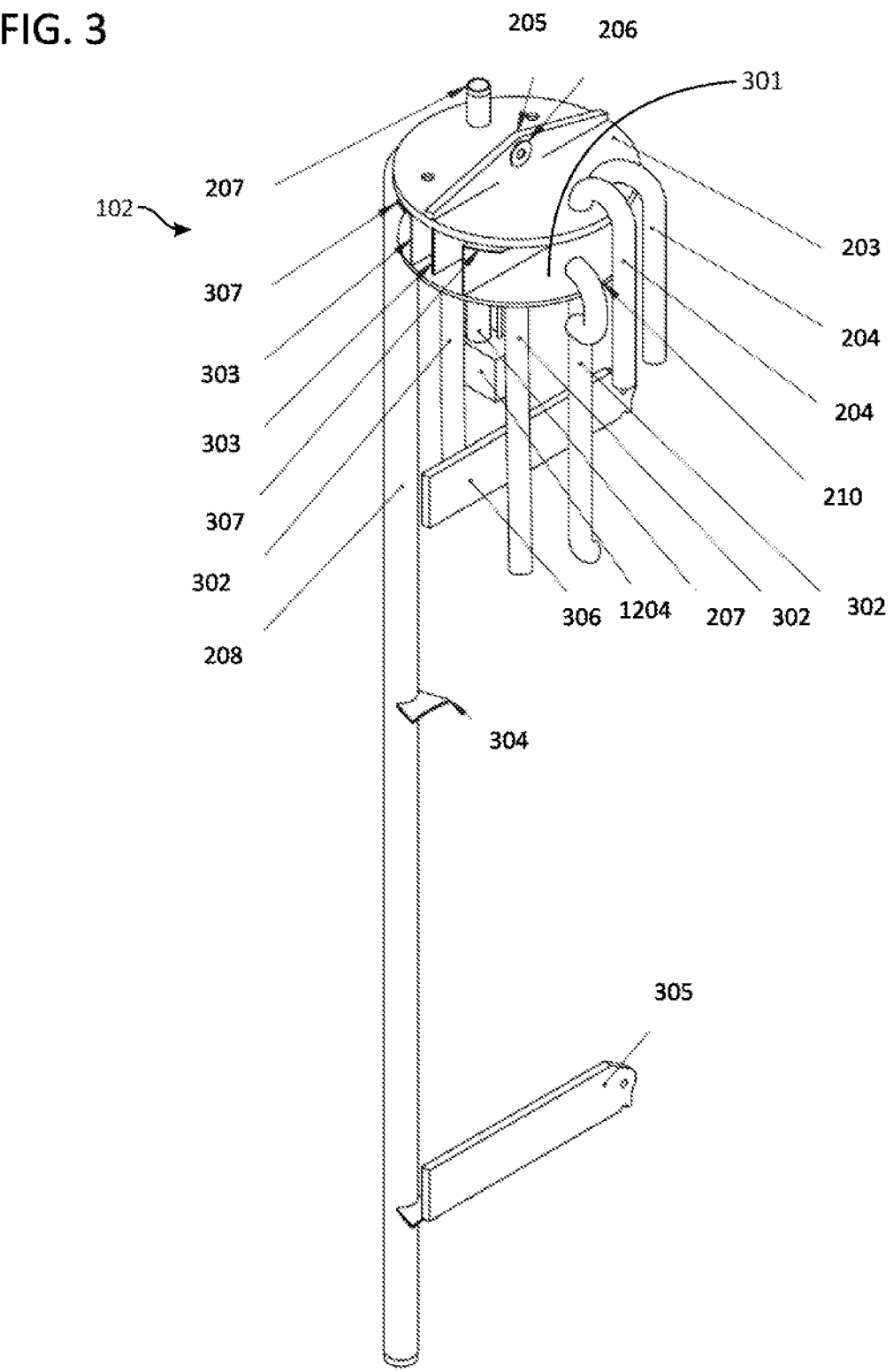
FIG. 3 shows a partial interior view of an improved underwater separator.
Figure 7:
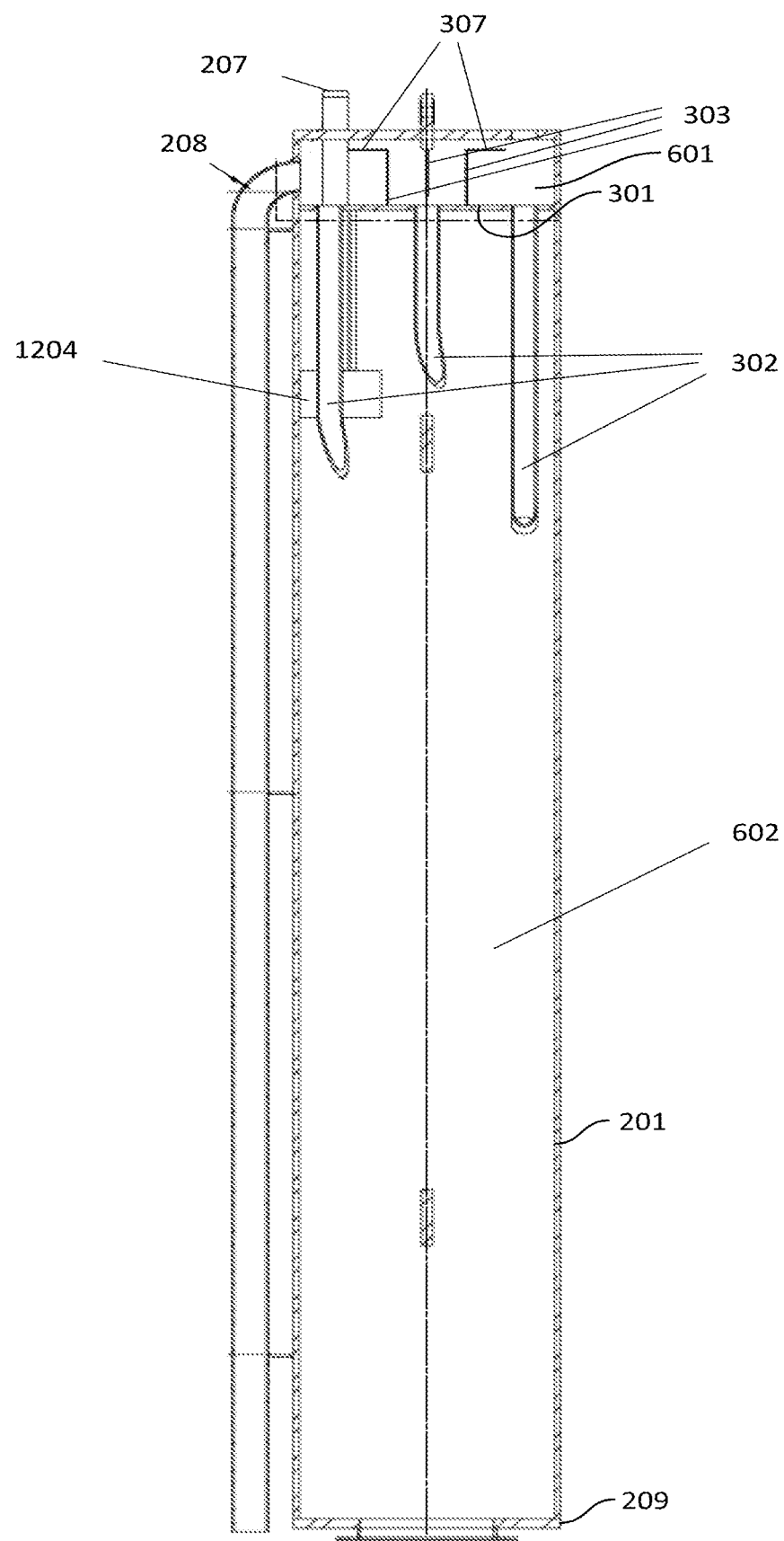
FIG. 7 shows an alternate partial interior view of an improved underwater separator.

FIGS. 3 and 7 show various partial interior views of the separator 102 along with the separator lid 203 and the inlet pipe 208. Below, and parallel to, the separator lid 2 is an interior plate 301 that divides the interior into two sections (as further shown in FIG. 7): the upper chamber 601 and the lower chamber 602. In one embodiment the interior plate 301 is approximately 14 inches below the separator lid 203. One or more (and preferably three in one embodiment) oil downcomers 302 run through the interior plate 301 and connect the upper chamber 601 and the lower chamber 602. Also shown in FIG. 3 are the gas outlet pipes 204 that permit gas 106 collected in the upper chamber 601 to exit the separator 102.

The oil 105, gas 106 and water 107 collected by the collection dome 101 enter the upper chamber 601 of the separator 102 through the inlet pipe 208. Due to the relative density of the gas 106, the majority of gas 106 remains in the upper chamber 601 and is vented out of the separator 102 through the gas outlet pipes 204. In one embodiment, the gas outlet pipes 204 extend approximately 3 feet below the interior plate 301.

However, due to the greater density of the oil 105 and water 107 (relative to the gas 106), they flow downwards through the oil downcomers 302 into the lower chamber 602. Once in the lower chamber 602, the relative higher density of water 107 (as compared to the oil 105) results in the water 107 dropping to the bottom of the lower chamber 602, through the separator aperture 1507 (shown in FIG. 6) while the oil 105 remains in the lower chamber 602. As the lower chamber 602 fills with oil 105, the buoyancy of the oil 105 causes the oil 105 to form an oil pad between the gas vent pipe 210 and oil outlet pipe 207. In one embodiment, the oil outlet pipe 207 is approximately 5 feet 6 inches in length.

The upper chamber 601 may further comprise a baffle system (also shown in FIG. 10) comprised of latitudinal baffles 303 and longitudinal baffles 307. The baffles 303, 307 provide surface areas on which oil droplets may collect and eventually flow downwards through the oil downcomers 302 and into the lower chamber 602. FIG. 3 also depicts a brace 304 and mounting plate 305 that secure the inlet pipe 208 to the separator exterior 201.

Figure 4:
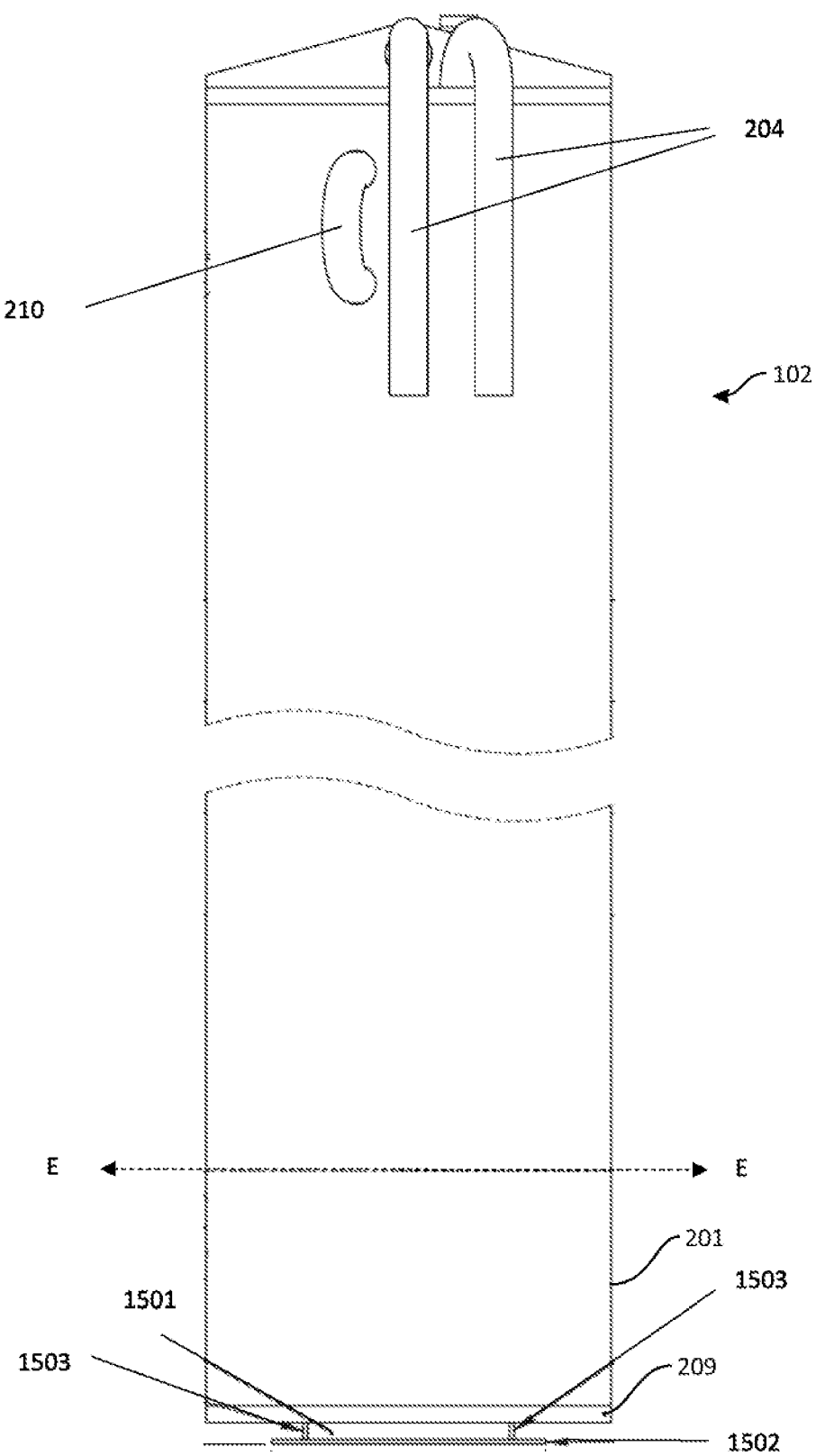
FIG. 4 shows a right side view of an exterior of an improved underwater separator.

FIG. 4 depicts a partial right side view of a separator 102. Looking at the bottom of FIG. 4, a separator bottom 209 (comprised of solid steel) connects the separator exterior 201 to the sides 1503 of the separator baffle 1501. The separator baffle 1501 (shown in more detail in FIGS. 14-16) serves to calm the accumulated oil 105 in the lower chamber 602 and to prevent surges and motion caused by wave currents or action. By reducing turbulence in the oil 105, the amount of gas 106 trapped in the oil 105 is reduced and better oil/gas separation is achieved. Additionally, as the oil 105 comprising entrained gas 106 contacts the top, middle and bottom baffle panels 1504, 1505 and 1506 (described in more detail below), the gas 106 bubbles will coalesce on the baffle panels 1504, 1505 and 1506 thereby further separating gas 106 entrained in the oil 105. FIG. 4 also shows a portion of the sides 1503 of the separator baffle 1501 and the separator baffle bottom perimeter 1502 extending below the separator bottom 209.

Figure 5:
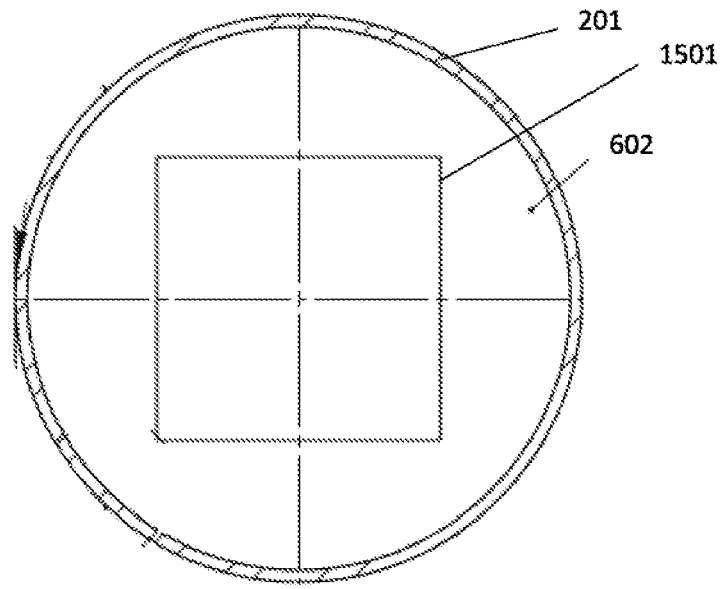
FIG. 5 shows a cross-section of a lower chamber, including a separator baffle, of an improved underwater separator.
Figure 6:
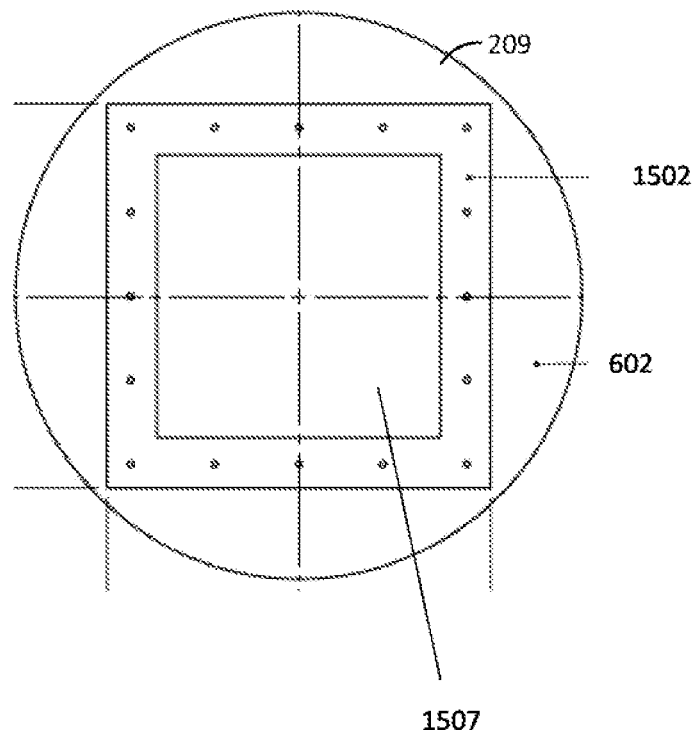
FIG. 6 shows a view looking upwards through a bottom of an improved underwater separator.

FIG. 5 shows a cross-section of the separator 102 taken on the line E-E of FIG. 4. As seen in this cross-section view, the separator baffle 1501 is generally square in shape and located in the center of the bottom of the lower chamber 602. FIG. 6 shows a view of the separator bottom 209 looking upwards. The interior of the separator baffle 1501 can be seen through the separator aperture 1507 which is also surrounded by the separator baffle bottom perimeter 1502.

Figure 8:
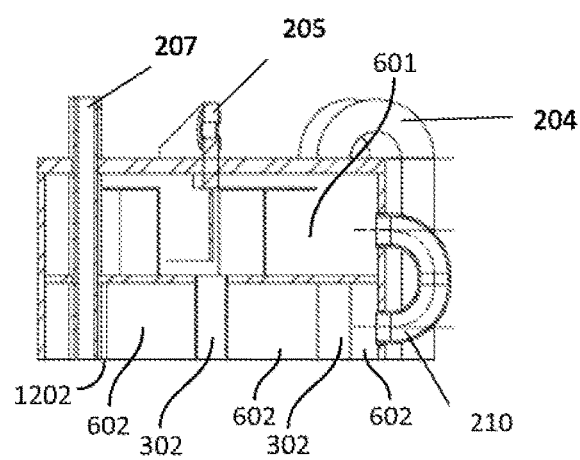
FIG. 8 shows a cross-section view of an upper portion of an improved underwater separator.
Figure 10:
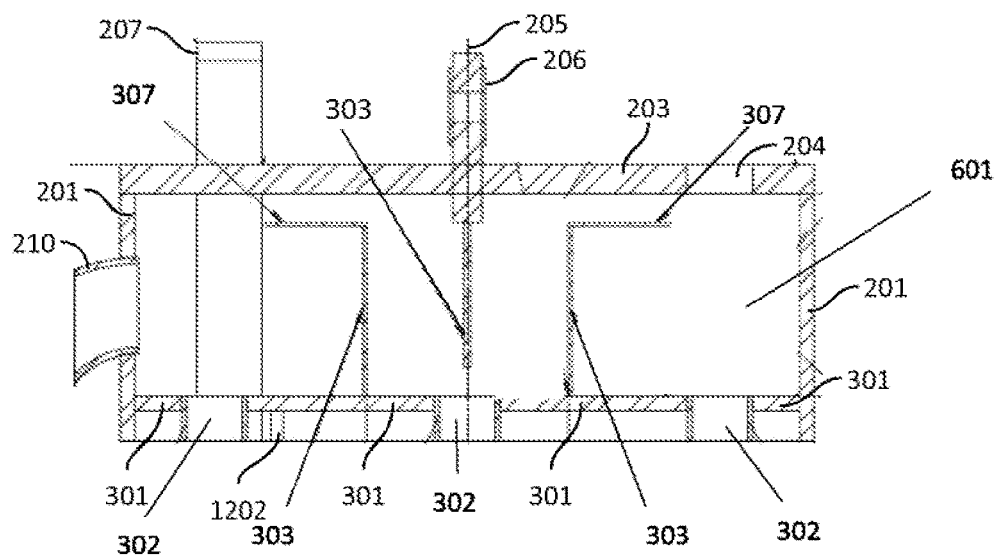
FIG. 10 shows a detailed cross-section view of an upper chamber of an improved underwater separator.

The latitudinal baffles 303 and longitudinal baffles 307 of the upper chamber 601 are shown in detail in FIGS. 8 and 10. In one embodiment there are three latitudinal baffles 303 that extend almost the entire height of the upper chamber 601 and two longitudinal baffles that are attached to, and perpendicular to, two of the latitudinal baffles 303.

FIG. 8 also shows the gas vent pipe 210 improvement. This gas vent pipe 210 connects the lower chamber 602 to the upper chamber 601 and permits any gas 106 that collects at the top of the lower chamber 602 to travel back to the upper chamber 601. Since the gas vent pipe 210 is separate from the oil downcomers 302, the gas 106 can vent through the gas vent pipe 210 even as oil 105 is flowing down through the oil downcomers 302. In this embodiment, the center of the top opening of the gas vent pipe 210 is 1 foot and 1½ inches above the center of the bottom opening of the gas vent pipe 210. It is highly advantageous to remove as much gas 106 as possible from the oil 105 so that the gas 106 does not take up valuable space in the oil storage containers 103.

Figure 9:
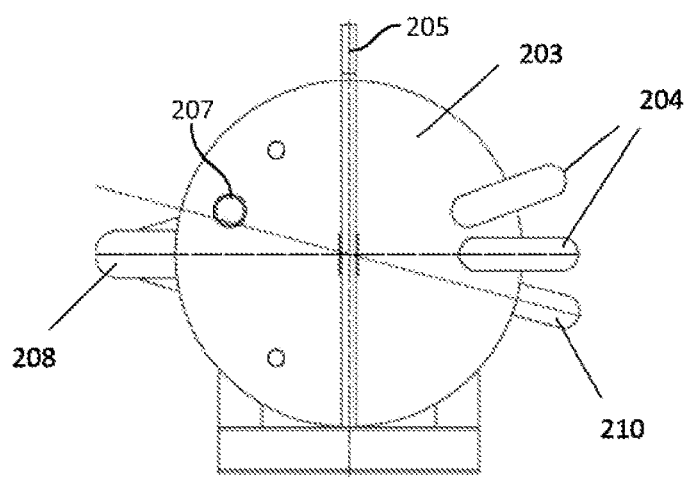
FIG. 9 shows a view looking downwards at a top of an improved underwater separator.

FIG. 9 shows a detailed view of the separator lid 203 of the separator 102. The gas outlet pipes 204 can be seen extending from the separator lid 203 along with the inlet pipe 208 entering the side of the separator 102.

Figure 11:
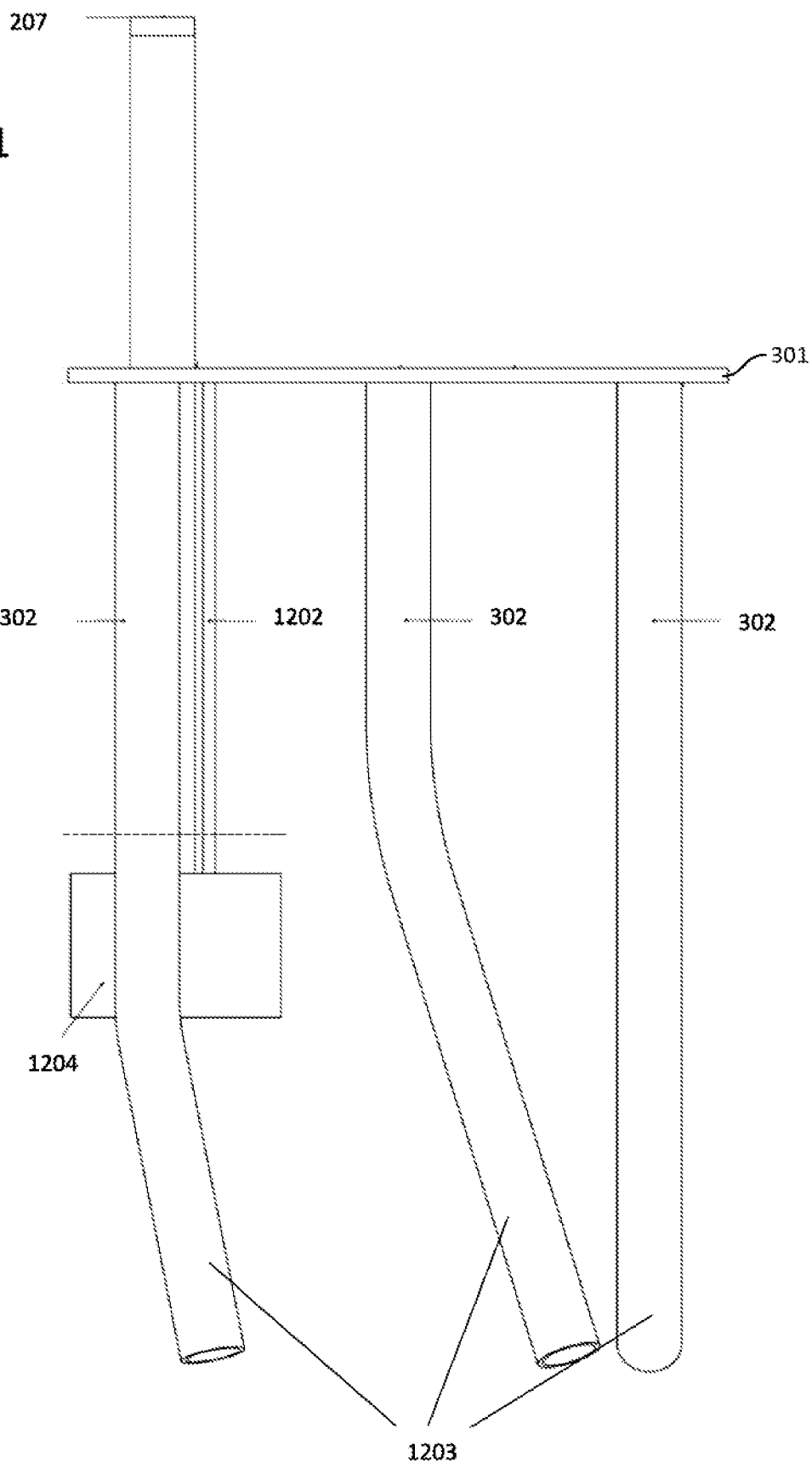
FIG. 11 shows an alternate partial interior view of an improved underwater separator.
Figure 12:
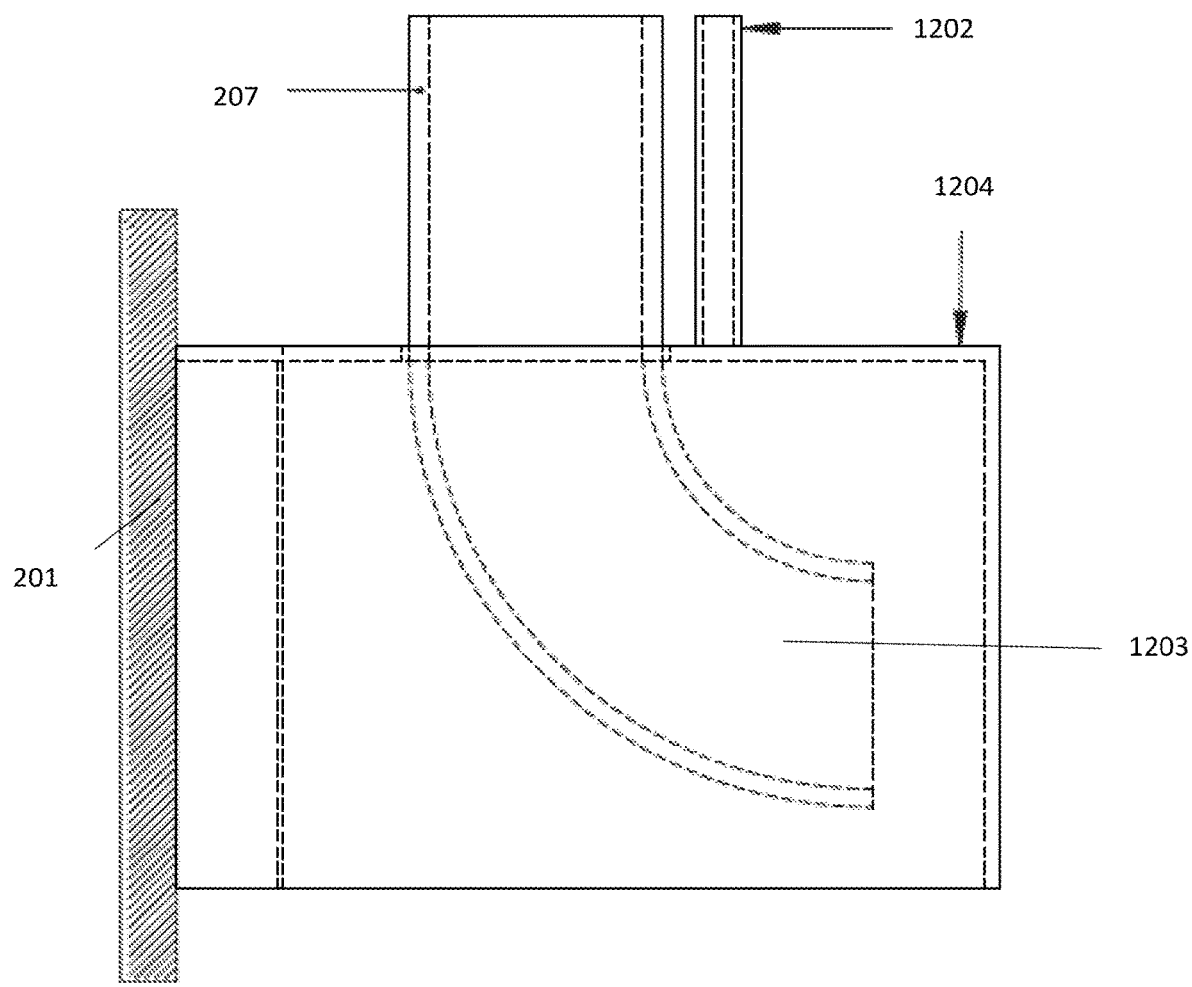
FIG. 12 shows a cross-section of a gas shield box.
Figure 13:
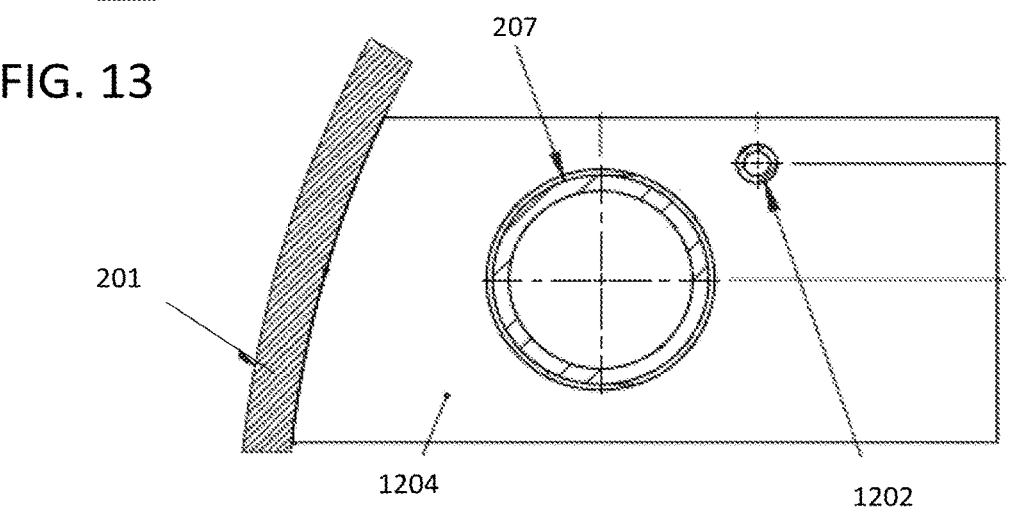
FIG. 13 shows a view looking downwards at a gas shield box.

FIGS. 11, 12 and 13 depict the oil downcomers 302, the oil outlet pipe 207 and the gas shield box 1204 surrounding a portion of the oil outlet pipe 207. As can be seen in FIG. 11, the oil downcomers 302 pass through the interior plate 301 and connect the upper 601 and lower 602 chambers (and transport oil 105 from the upper chamber 601 to the lower chamber 602). FIG. 11 also depicts a gas shield box 1204 and a gas equalization pipe 1202.

Both the gas shield box 1204 and the gas equalization pipe 1202 also assist in better separating the gas 106 from the oil 105 by developing and stabilizing the oil pad within the lower chamber 602. The five-sided gas shield box 1204 (also shown in FIGS. 12 and 13) surrounds the lower portion of the oil outlet pipe 207 with three sides connecting to the wall of the separator 102 to create the fifth wall. The bottom of the gas shield box 1204 remains open. The gas shield box 1204 thereby creates a barrier around the oil outlet pipe 207 to help divert any gas 106 bubbles in the oil 105 from entering the oil outlet pipe 207. Additionally, if any gas 106 collects between the oil outlet pipe 207 and the interior of the gas shield box 1204, the gas equalization pipe 1202 transports the collected gas 106 back to the upper chamber 601. Again, it is highly advantageous to completely, or near completely, remove gas 106 from the oil 105 so to preserve valuable oil storage container 103 space.

FIGS. 11 and 12 also show the angled ends 1203 of the oil downcomers 302 and the oil outlet pipe 207 that also assist in separating the gas 106 from the oil 105. As can be seen in FIG. 12, the angled end 1203 of the oil outlet pipe 207 is at approximately a 90 degree angle. Since gas bubbles 106 travel directly upwards, the 90 degree bend in the angled end 1203 prevents gas bubbles 106 from exiting the separator 102 with the oil 105 through the oil outlet pipe 207. Instead of travelling up the oil outlet pipe 207, the gas bubbles 106 are instead trapped by the gas shield box 1204 and transported back to the upper chamber through the gas equalization pipe 1202.

FIG. 11 also depicts the angled ends 1203 of the oil downcomers 302. In one embodiment, the angled ends 1203 are angled between 120-165 degrees from the lengths of the oil downcomers 302. These angled ends 1203 serve to direct the flow of oil 105 entering the lower chamber 602 away from the oil outlet pipe 207 and past the developed oil pad in the lower chamber 602. By creating a larger distance between the oil downcomers 302 and the oil outlet pipe 207, there is a greater opportunity for any entrained gas 106 to be separated from the oil 105 in the lower chamber 602 and be transported back to the upper chamber 601 via the gas vent pipe 210. Further, by directing the angled ends 1203 towards the exterior 201 of the separator 201, more oil 105 contacts the surface area of the exterior 201, thereby promoting coalescence of any gas 106 on surface and removing entrained gas 106 from the oil 105.

Figure 14:
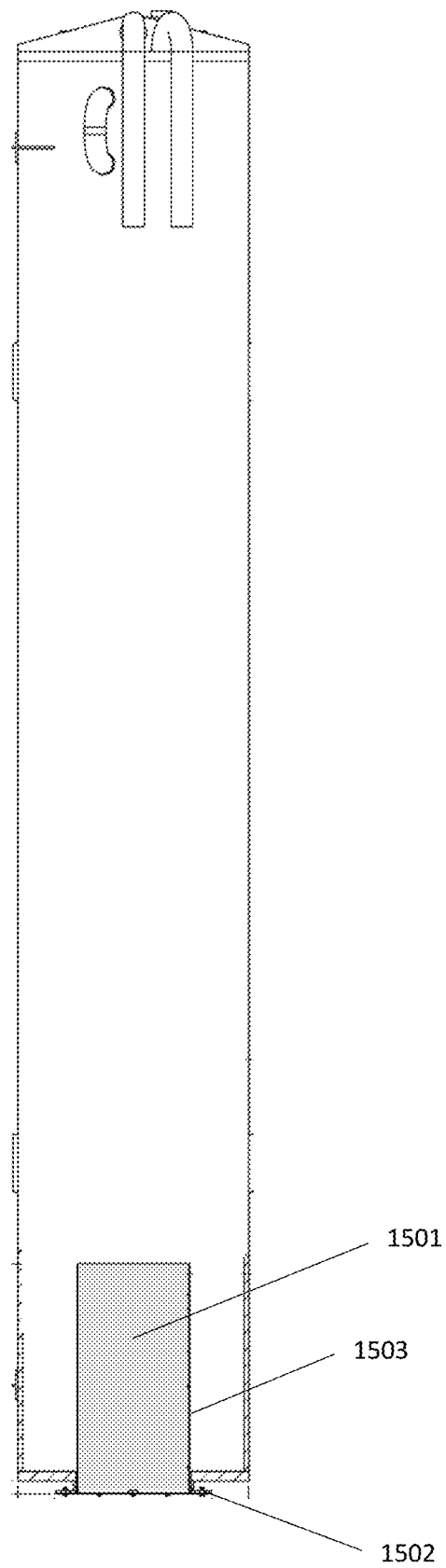
FIG. 14 shows an alternate partial interior view of an improved underwater separator, including a separator baffle in a lower chamber.
Figure 15:
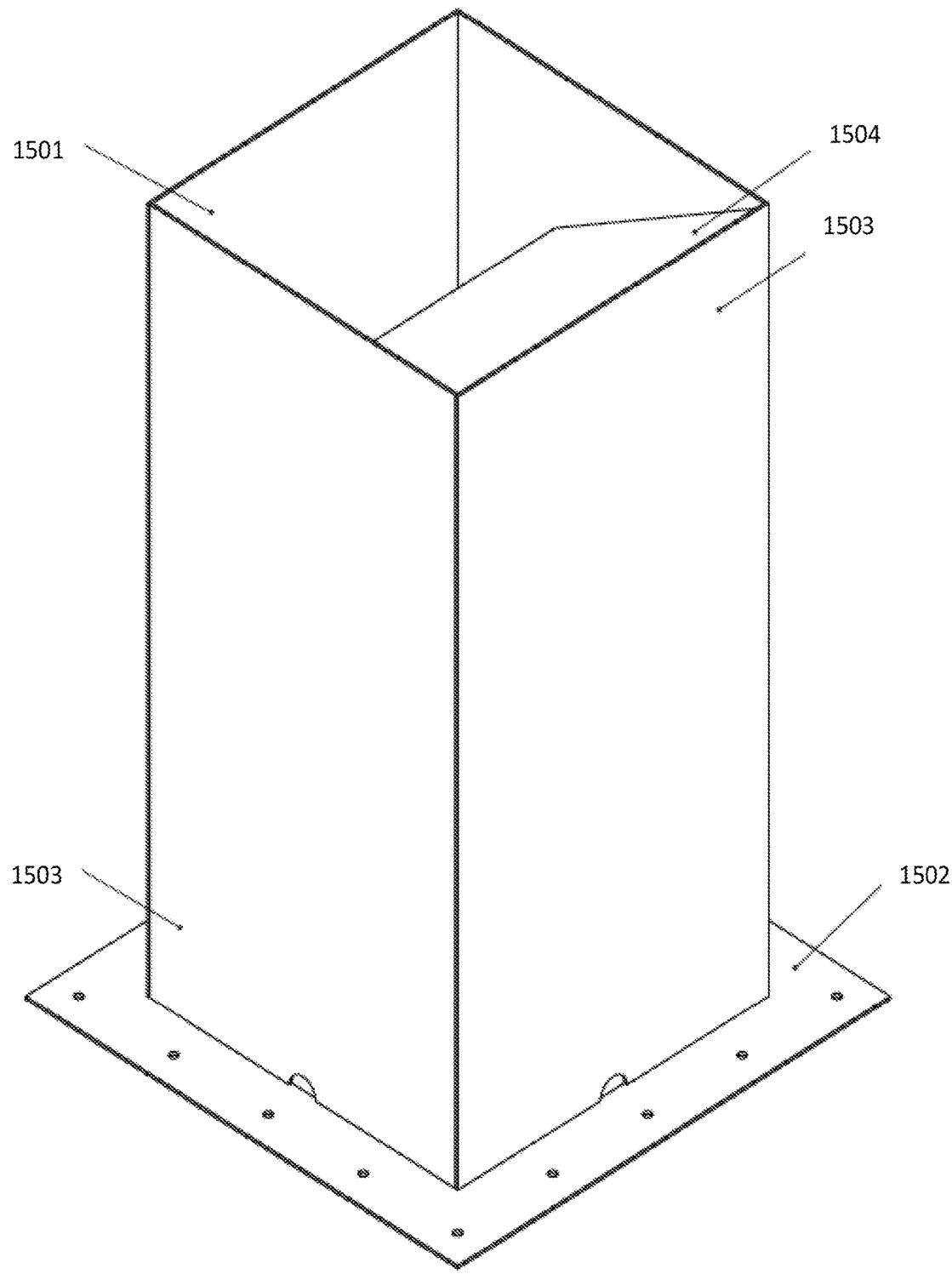
FIG. 15 shows a perspective view of a separator baffle.
Figure 16:
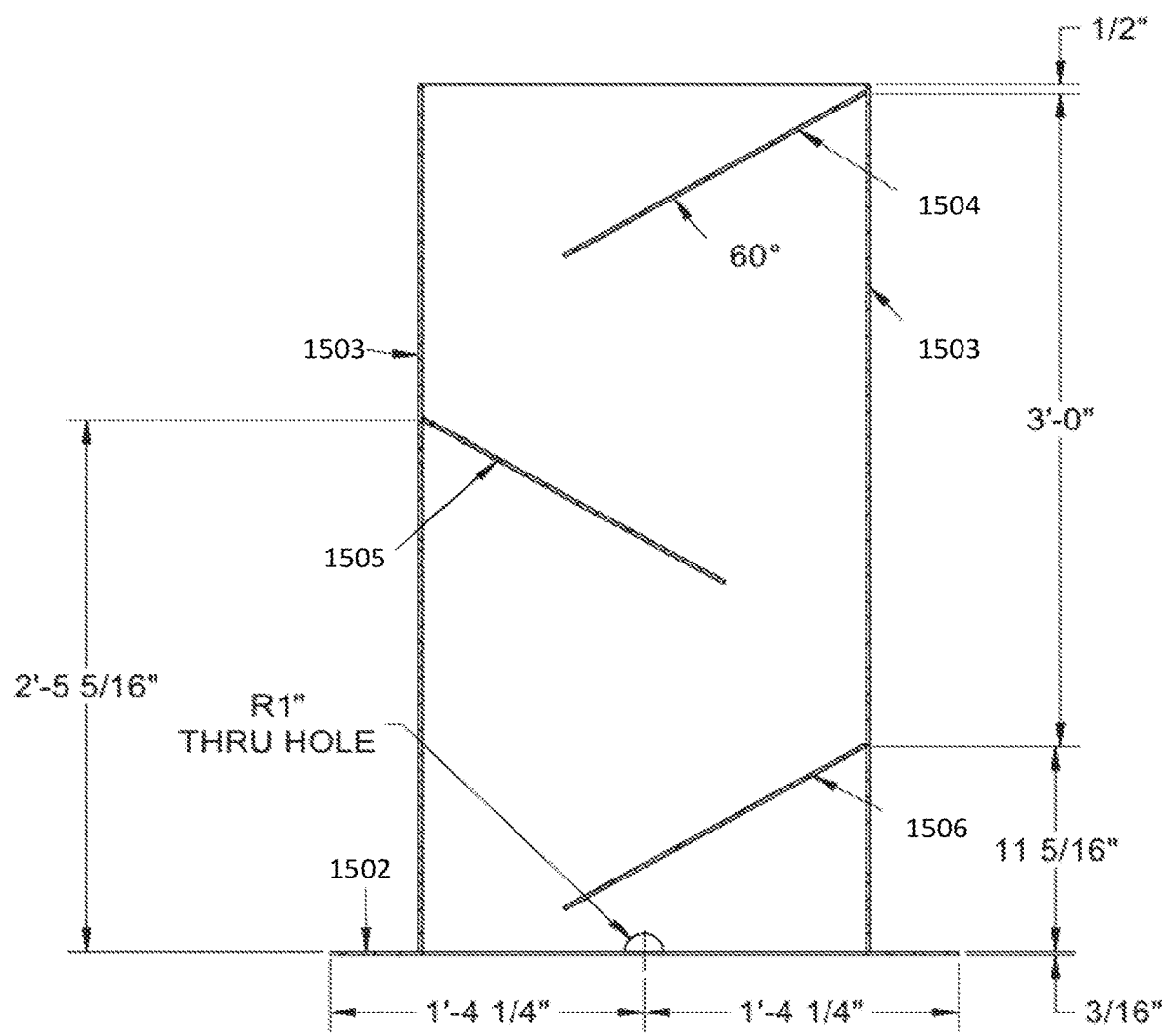
FIG. 16 shows a cross-section view of a separator baffle.

FIGS. 14-16 depict a separator baffle 1501 located at the bottom of the lower chamber 602 to calm the accumulated oil 105 pad in the lower chamber 602, prevent surges and motion from wave currents and further separates any entrained oil 105 droplets. In one embodiment, the separator baffle 1501 is square in shape with four separator baffle sides 1503 and is approximately four feet tall and approximately 2 feet in length and width. As shown in FIGS. 6, 15 and 16, a separator aperture 1507 is formed by the four separator baffle sides 1503 and a separator baffle bottom perimeter 1502 surrounds the separator aperture 1507. In one embodiment, the separator bale bottom perimeter 1502 is approximately 5 inches in width. In one embodiment (as shown in FIG. 16), the interior of the separator baffle 1501 comprises three baffle panels: a top baffle panel 1504, middle baffle panel 1505 and bottom baffle panel 1506. Each baffle panel 1504, 1505, 1506 is approximately 2 feet in length and each is positioned downward sloping position at a 60 degree angle from the separator baffle side 1503.

Water 107 that may surge from either wave action or currents blowing around the separator 102, can cause the oil 105 stored in the separator 102 to surge up and down and disturbing the developed oil 105 pad formed in the lower chamber 602. The square separator baffle 1501 shields the interior storage area of the lower chamber 602 from this surging action and assists in keeping the oil 105 in a reduced motion storage area within the interior of the lower chamber 602. Additionally, the top, middle and bottom baffle panels 1504, 1505 and 1506 provide additional surface areas upon which entrained gas 106 may coalesce and thereby be further separated from the oil 105.

The foregoing disclosure and description of the inventions are illustrative and explanatory. Various changes in the size, shape and materials, as well as in the details of the illustrative construction and/or an illustrative method may be made without departing from the spirit of the invention.

What is claimed is:

1. An improved underwater oil, gas and water separator comprising:
    a separator exterior enclosing an upper chamber and a lower chamber wherein the upper chamber and lower chamber are separated by an interior plate;
    a separator lid secured to the top of the separator exterior;
    at least one gas outlet pipe connected to the separator lid;
    a gas vent pipe connecting the lower chamber and the upper chamber wherein the gas vent pipe comprises two ends with a first end adjacent to the upper chamber through the separator exterior and a second end adjacent to the lower chamber also though the separator exterior;
    an oil outlet pipe passing through the separator lid, the upper chamber, the interior plate and into the lower chamber;
    at least one oil downcomer passing through the interior plate and connecting the upper chamber and lower chamber; and
    a separator baffle substantially located within the lower chamber.

2. The improved underwater oil, gas and water separator of claim 1 further comprising:
    a gas shield box located in the lower chamber and surrounding a lower portion of said oil outlet pipe.

3. The improved underwater oil, gas and water separator of claim 2 wherein:
    said oil outlet pipe comprises an angled end located in the lower chamber with said angled end at an approximate 90 degree angle to the oil outlet pipe.

4. The improved underwater oil, gas and water separator of claim 2 further comprising:
    a gas equalization pipe connecting the gas shield box and the upper chamber.

5. The improved underwater oil, gas and water separator of claim 1 wherein:
    the separator baffle comprises four baffle sides and a separator aperture at a bottom of the separator baffle; and
    top, middle and lower baffle panels enclosed by the four baffle sides.

6. The improved underwater oil, gas and water separator of claim 5 wherein:
    each of the top, middle and lower baffle panels are in downward sloping position.

7. The improved underwater oil, gas and water separator of claim 1 wherein:

the at least one oil downcomer comprises an angled end located in the lower chamber wherein said angled end is angled away from said oil outlet pipe.

8. The improved underwater oil, gas and water separator of claim 1 further comprising:
a gas shield box located in said lower chamber and a gas equalization pipe connecting said gas shield box and said upper chamber.

9. The improved underwater oil, gas and water separator of claim 1 wherein:
said upper chamber further comprises a baffle system for collecting oil droplets and
said baffle system is connected to said interior plate.

10. The improved underwater oil, gas and water separator of claim 9 wherein:
said baffle system comprises at least one longitudinal baffle connected to at least one latitudinal baffle.

11. The improved underwater oil, gas and water separator of claim 8 wherein:
said upper chamber further comprises a baffle system for collecting oil droplets and
said baffle system is connected to said interior plate.

12. The improved underwater oil, gas and water separator of claim 11 wherein:
said baffle system comprises at least one longitudinal baffle connected to at least one latitudinal baffle.

13. An improved underwater oil, gas and water separator comprising:
an upper chamber and a lower chamber wherein the upper chamber and lower chamber are enclosed by a separator exterior and separated by an interior plate; at least one gas vent pipe capable of venting gas from the lower chamber to the upper chamber;
an oil outlet pipe capable of moving oil from the lower chamber out of the separator;
at least one oil downcomer capable of moving oil from the upper chamber to the lower chamber; and
a separator baffle capable of calming said oil located in the lower chamber.

14. The improved underwater oil, gas and water separator of claim 13 further comprising:
a gas shield box surrounding a portion of the oil outlet pipe and further capable of preventing at least some gas from entering the oil outlet pipe.

15. The improved underwater oil, gas and water separator of claim 14 wherein:
said oil outlet pipe comprises an angled end located in the lower chamber wherein said angled end is angled so to prevent at least some gas from entering the oil outlet pipe.

16. The improved underwater oil, gas and water separator of claim 14 further comprising:
a gas equalization pipe capable of venting gas from the gas shield box to the upper chamber.

17. The improved underwater oil, gas and water separator of claim 13 wherein:
the at least one oil downcomer comprises an angled end located in the lower chamber wherein said angled end is angled so to prevent at least some gas from entering the oil outlet pipe.

18. The improved underwater oil, gas and water separator of claim 13 wherein:
said upper chamber further comprises a baffle system for collecting droplets of said oil and said baffle system is connected to said interior plate.

19. The improved underwater oil, gas and water separator of claim 18 wherein:
said baffle system comprises at least one longitudinal baffle connected to at least one latitudinal baffle.

20. The improved underwater oil, gas and water separator of claim 5 wherein:
each of the top, middle and lower baffle panels are in downward sloping position at a 60 degree angle from the baffle sides.

21. The improved underwater oil, gas and water separator of claim 1 wherein:
the separator baffle comprises one or more baffle sides and a separator aperture at a bottom of the separator baffle; and a plurality of baffle panels enclosed by said one or more baffle sides.

\* \* \* \* \*